(12) United States Patent  (10) Patent No.: US 8,572,857 B2
Stamenkovic  (45) Date of Patent: Nov. 5, 2013

(54) APPARATUS FOR MEASURING OBJECTS

(75) Inventor: Milan Stamenkovic, Stuttgart (DE)

(73) Assignee: Stotz Feinmesstechnik GmbH (DE)

( * ) Notice: Subject to any disclaimer, the term of this patent is extended or adjusted under 35 U.S.C. 154(b) by 200 days.

(21) Appl. No.: 13/081,152

(22) Filed: Apr. 6, 2011

(65) Prior Publication Data

US 2011/0247227 A1  Oct. 13, 2011

(30) Foreign Application Priority Data

Apr. 9, 2010 (DE) .......................... 10 2010 014 329
Jul. 12, 2010 (DE) .......................... 10 2010 026 891

(51) Int. Cl.
G01B 5/008 (2006.01)

(52) U.S. Cl.
USPC .......................................................... 33/503

(58) Field of Classification Search
USPC ............................. 33/503, 507, 551, 200, 28
See application file for complete search history.

(56) References Cited

U.S. PATENT DOCUMENTS

| 4,995,170 | A * | 2/1991 | Brule et al. | 33/551 |
| 5,121,550 | A * | 6/1992 | Wood et al. | 33/551 |
| 7,134,215 | B2 | 11/2006 | Looser et al. | |
| 7,436,523 | B2 * | 10/2008 | Tanaka et al. | 33/551 |
| 7,467,472 | B2 * | 12/2008 | Jacq | 33/200 |
| 7,500,316 | B2 * | 3/2009 | Haddadi | 33/200 |
| 7,571,545 | B2 * | 8/2009 | Nauche et al. | 33/200 |
| 2011/0247227 | A1 * | 10/2011 | Stamenkovic | 33/503 |
| 2011/0247228 | A1 * | 10/2011 | Stamenkovic | 33/503 |

FOREIGN PATENT DOCUMENTS

| DE | 2857492 A1 | 8/1980 |
| DE | 3832331 A1 | 3/1990 |
| DE | 4139712 A1 | 6/1992 |
| DE | 4308283 A1 | 9/1993 |
| DE | 10244025 A1 | 4/2004 |
| WO | 7900291 A1 | 5/1979 |

OTHER PUBLICATIONS

German Search Report dated Jun. 9, 2011.

* cited by examiner

*Primary Examiner* — Yaritza Guadalupe-McCall
(74) *Attorney, Agent, or Firm* — Cantor Colburn LLP

(57) ABSTRACT

An apparatus for measuring objects includes a base plate for supporting an object to be measured and includes a probe. The probe is movable relative to the object by means of an actuator to sample the object in a contacting manner, wherein the probe carries, and in particular supports in a mount, a sampling body, in particular an elongate sampling body, whose front end is designed as a measuring tip for a contact with the object. The probe is arranged beneath the base plate, wherein at least one recess is provided in the base plate for leading through at least one section of the sampling body.

14 Claims, 9 Drawing Sheets

APPARATUS FOR MEASURING OBJECTS

CROSS-REFERENCES TO RELATED APPLICATIONS

This patent application claims the benefit of priority to German Patent Application Serial No. 102010014329.4, filed Apr. 9, 2010, and claims the benefit of priority to German Patent Application Serial No. 102010026891.7, filed Jul. 12, 2010, each of which are incorporated herein by reference in their entirety.

FIELD OF THE INVENTION

The present invention relates to an apparatus for measuring objects, in particular to a coordinate measuring unit, having a base plate for supporting an object to be measured and having a probe which is movable relative to the object by means of an actuator to sample the object in a contacting manner. The probe carries or supports in a mount, a sampling body, in particular an elongate sampling body, whose front end is designed as a measuring tip for a contact with the object.

BACKGROUND OF THE INVENTION

Apparatus of the named kind are in particular used to determine geometrical parameters of workpieces. The workpiece is usually fastened to the base plate using a mechanical mount. The base plate is built as solidly as possible and also serves, in addition to the support of the workpiece, as a reference for a coordinate system. The workpiece has to be mechanically fixed in a sufficient manner so that it does not move relative to the base plate during the measurement. The mechanical mount may not deform the workpiece. The workpiece fastened in the mount is sampled from above for the measurement.

Common coordinate measuring units are as a rule designed for relatively large objects to be measured. They typically have an average measuring range between 200 mm×200 mm×200 mm and 50 mm×500 mm×500 mm. The space requirements for installing a common coordinate measuring unit can accordingly amount to between 1500×1500×1500 mm and 4000×4000×4000 mm. Such large machines can have an overdimensioned effect to the extent that mainly relatively small objects are to be measured, e.g. objects of a size of approximately 10 mm×10 mm×10 mm. There is moreover the problem that with a variety of workpiece shapes to be measured the mechanical mount becomes undesirably complex and/or a plurality of replaceable mounts have to be provided.

SUMMARY OF THE INVENTION

Accordingly, it is desirable to provide an apparatus for measuring objects which has reduced space requirements and allows a flexible measurement of different objects.

In accordance with an exemplary embodiment of the invention, an apparatus for measuring objects is provided. It includes a base plate for supporting an object to be measured and a probe which is movable relative to the object by means of an actuator to sample the object in a contacting manner. The probe carries a sampling body whose front end is formed as a measuring tip for a contact with the object, wherein the probe is arranged beneath the base plate. At least one cut-out is provided in the base plate for leading through at least one section of the sampling body.

The invention therefore, does not sample the object from above, but from below. This represents a turning away from a principle consistently followed in the technical world since the known three-dimensional coordinate measuring systems of all standard construction types—such as boom construction, stand construction, gantry construction or bridge construction—are based on a sampling of the object or workpiece to be measured from above.

In another exemplary embodiment of the invention, the object is placed directly onto the base plate and sampled from below using the sampling body. It is therefore possible by the sampling from below to place the object directly onto the base plate, i.e. without mount or mount holder. The sampling body can be introduced with the measuring tip from underneath into the object to be measured via the cut-out in the base plate. The base plate thus so-to-say takes over the function of a mechanical workpiece mount. An advantage of the invention is thus that different workpieces can be measured directly after one another since no mount is required for the workpieces. It is therefore not necessary, as in the prior art, to replace or adapt the mount for each workpiece. The total size of the apparatus can furthermore be substantially reduced and the structure simplified. An apparatus results overall by the reduction in the space requirements and by the simplification of the mechanical mount which is in particular suitable for the efficient measurement of relatively small parts such as dental implants, small bores or conical shapes. The sampling by means of the sampling body in another respect takes place in a known manner, with the reaching of a wall of the object being able to be determined by strain gages or capacitive sensors. Other methods for determining the reaching of a wall are also possible.

In accordance with one embodiment of the invention, the base plate has a support surface, in particular a planar support surface, for the direct placing on of an object to be measured. The object to be measured can thus—provided it is sufficiently heavy—remain on the base plate in a stationary manner on its own due to its own weight so that specific mounts or holders can be saved.

A holding-down device which is designed to press the object toward the support surface from above can also be provided in an embodiment of the invention to fix an object to be measured on the base plate. Such a holding-down device can provide an additional fixing with relatively light objects.

In another embodiment of the invention, the recess can include at least one linear path section. The sampling body can be moved within the linear path section and thus e.g. determine a wall spacing along the path section. To be able to determine wall spacings in different directions, a plurality of linear path sections can accordingly also be provided.

In accordance with yet another exemplary embodiment, the cut-out includes a central free space and at least two linear path sections extending outwardly from the central free space. The central free space allows a measurement in any desired directions. Parts of the object can lie in the outer region of the linear web sections. The shape of the cut-out can generally be adapted in a variety of manners to the respective application. It only has to be ensured that the object to be measured does fall through the cut-out, that is that a sufficient support surface is present on the base plate. A sufficient strength of the base plate is also contemplated in an embodiment.

The cut-out can in particular be cross-shaped, star-shaped or rake-shaped or other known shapes. This allows a particularly flexible measurement of different objects.

In still yet another embodiment, the probe is movable by means of the actuator between a position of rest in which the sampling body does not project beyond a support surface of the base plate and an operating position in which the sampling body, is guided through the cut-out from below and the measuring tip is located above the support surface. In the position of rest, the sampling body, with its sensitive measuring tip is protected in one embodiment, so that any damage can be avoided. For a measuring procedure, the sampling body can again be moved out in a simple manner through the cut-out into the operating position. Such a movability of the probe also enables a change between a plurality of cut-outs of the base plate separated from one another.

In accordance with a further exemplary embodiment, the probe is movable by means of the actuator in a plurality of different heights for measurement. This allows a particularly flexible three-dimensional measurement of objects.

Further, it is contemplated in another embodiment, at least one centering element can be attached or attachable to the base plate for positioning an object to be measured. As such, particularly small workpieces can thereby be precentered in this manner. For example, a ring can be attached to the base plate as a centering element. Such centering elements are in particular helpful when bores have to be measured which are only slightly larger than the diameter of the measuring tip.

In still another embodiment, recesses for an engagement with projections of a centering element can be provided at the base plate, or vice versa. This enables a simple, fast and precise positioning of the centering element on the base plate.

The base plate can be attached to a housing in which the probe and the actuator are accommodated. A particularly simple and compact structure is thereby achieved.

In accordance with yet a further embodiment, the actuator is formed as a three-dimensional positioning system which is in mechanical connection with the base plate. The three-dimensional positioning system can be driven, for example, by piezoelectric motors and can have an installed length measuring device. A precise movability of the sampling body within the cut-out of the base plate is thereby achieved.

The above advantages and features will become more apparent from the following description taken in conjunction with the drawings.

BRIEF DESCRIPTION OF THE DRAWINGS

The invention will be described by way of example in the following with reference to the drawings.

DETAILED DESCRIPTION

Figure 8:
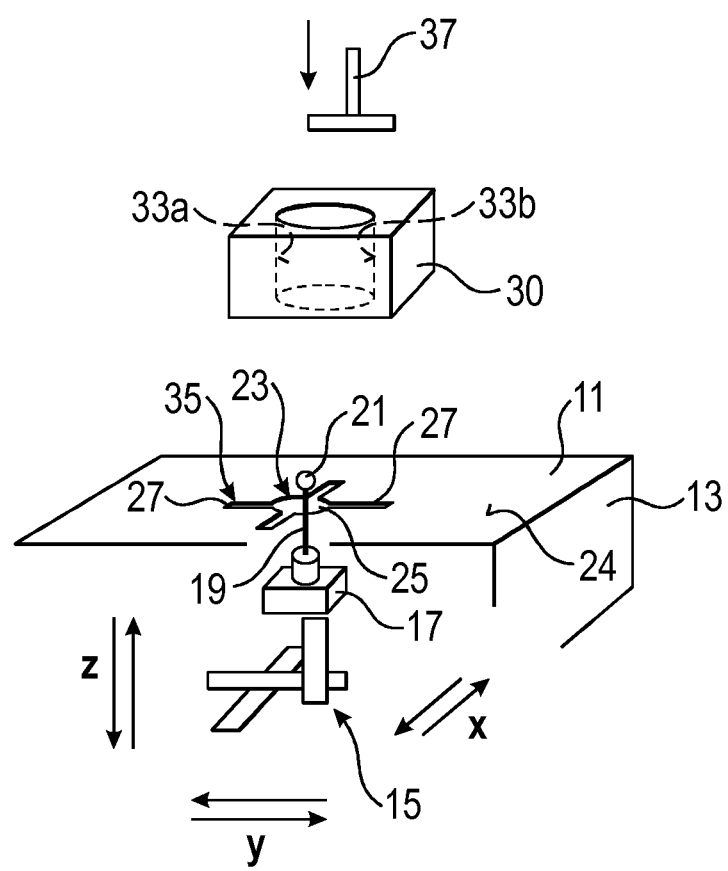
FIG. 8 is a cut-open part representation of the apparatus in accordance with FIG. 7.
Figure 9:
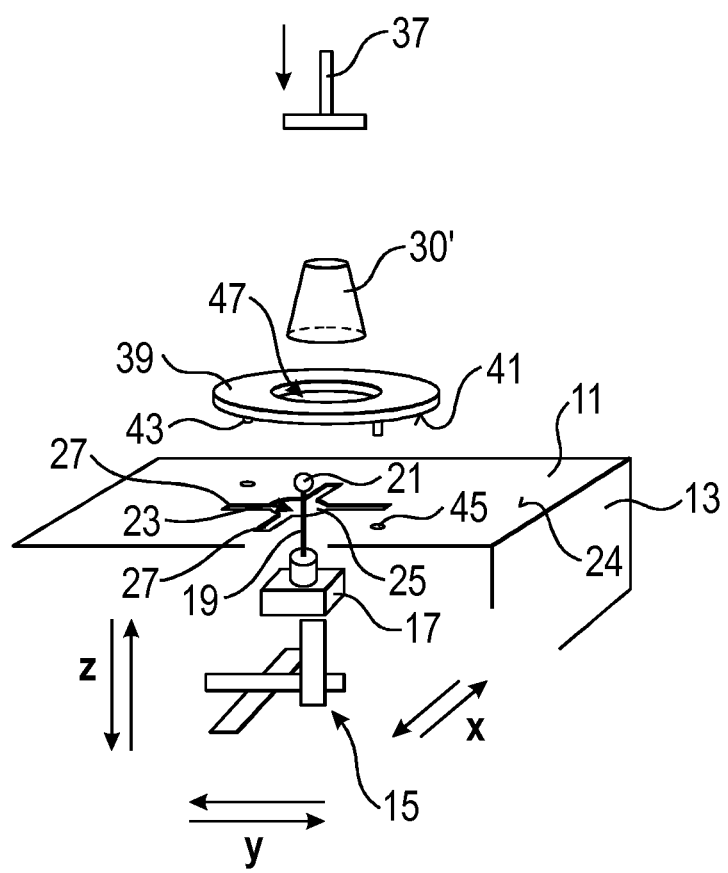
FIG. 9 is a further cut-open part representation of the apparatus in accordance with FIG. 7 which shows the use of a centering element.

Referring now to the Figures, where the invention will be described with reference to specific embodiments without limiting same, FIG. 8 shows a coordinate measuring unit includes a base plate 11 which is mounted on a housing 13. An actuator 15 is accommodated in the housing 13, is mechanically connected to the base plate 11 and carries a probe 17 having an elongate sampling body 19 supported therein. A sensing ball 21 which forms a measuring tip for sampling an object surface is provided at the front end 20 of the sampling body 19. The probe 17 with the sampling body 19 can be moved to the side and in height in three spatial directions x, y and z (FIGS. 8 and 9) by means of the actuator 15 which is formed as a triaxial positioning system or 3D slide.

As can be seen from FIGS. 1 and 7-9, the probe 17 is arranged beneath the base plate 11, with a front section of the sampling body 19 with the sensing ball 21 projecting through a cut-out 23 provided in the base plate 11. The sampling body 19 can be moved by means of the actuator 15 within the cut-out 23. A workpiece 30 to be measured is placed directly onto the base plate 11 which has a planar support surface 24 for this purpose. In accordance with FIGS. 3-5, the cut-out 23 is made in crosshair form and has a central free space 25 as well as four linear path sections 27 which extend outwardly from the central free space 25. The sampling body 19 therefore moves along the preset path sections 27 in the base plate 11. The width of the path sections 27 is smaller than the workpiece 30 and larger than the sensing ball 21 of the sampling body 19. The sampling body 19 thereby extends through the base plate 11 from below.

Figure 1:
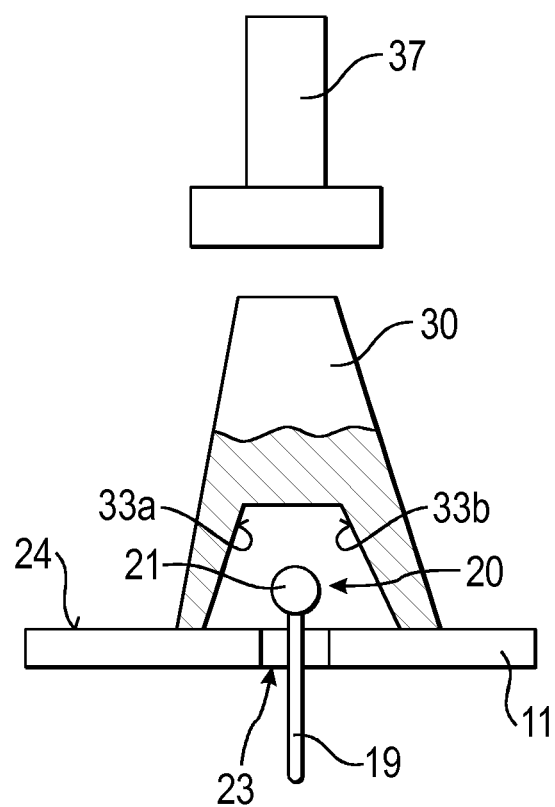
FIG. 1 is a simplified representation of an object measuring apparatus in accordance with the invention.
Figure 2:
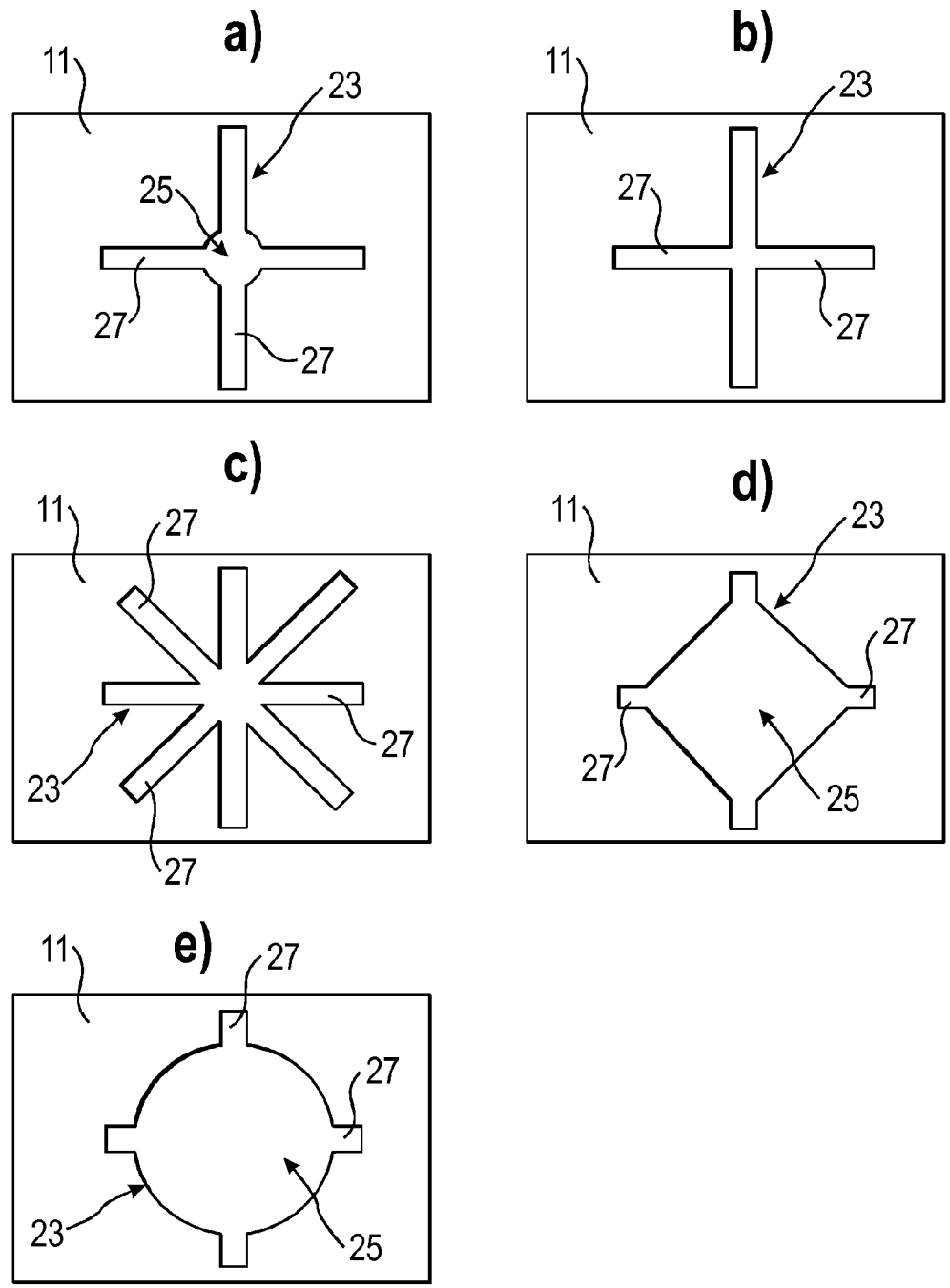
FIGS. 2a) to 2e) show different cut-outs in base plates for an apparatus in accordance with FIG. 1.

The shape of the cut-out 23 can in another respect be adapted in a variety of manners to the respective application. Example shapes for the cut-out 23 are shown in FIGS. 2a) to 2e) as well as in FIGS. 3 to 6 in a plan view. It is contemplated that the shape of the cut-out prevents, on the one hand, the workpiece 30 does not fall through the base plate 11 and that, on the other hand, the sensing ball 21 of the sampling body 19 can sample the workpiece 30 from below.

Figure 3:
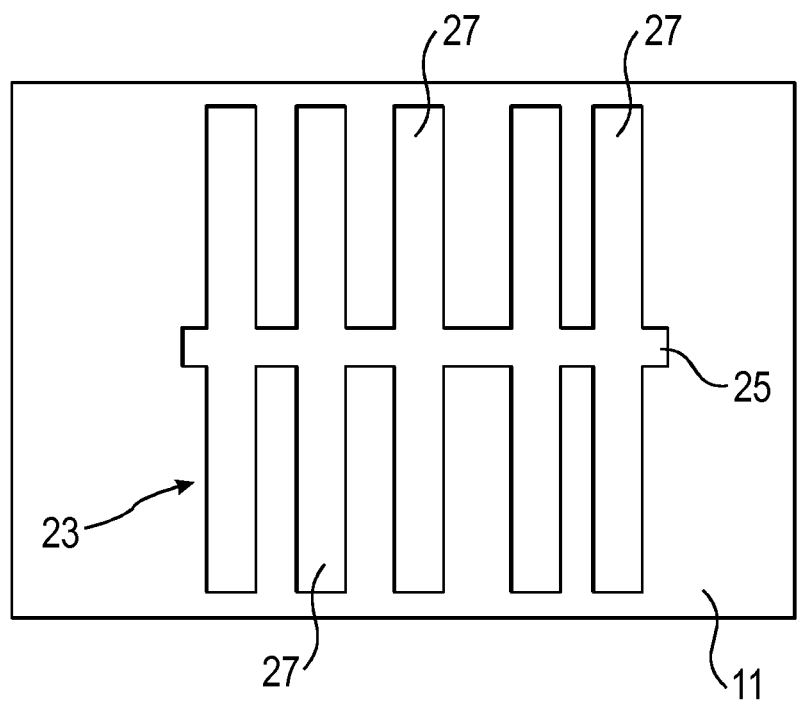
FIGS. 3 to 6 show further embodiments of cut-outs in base plates for an apparatus in accordance with FIG. 1.

FIG. 3 shows an embodiment in which the central free space 25 likewise forms a linear path section. The further linear path sections 27 extend parallel to one another and transversely to the central free space 25 so that a rake-shaped embodiment of the cut-out 23 results overall. In this manner, a grid-like sampling of the workpiece is supported which increases the flexibility in the measurement of different objects. The measurement of particularly complexly shaped objects is in particular facilitated.

Figure 4:
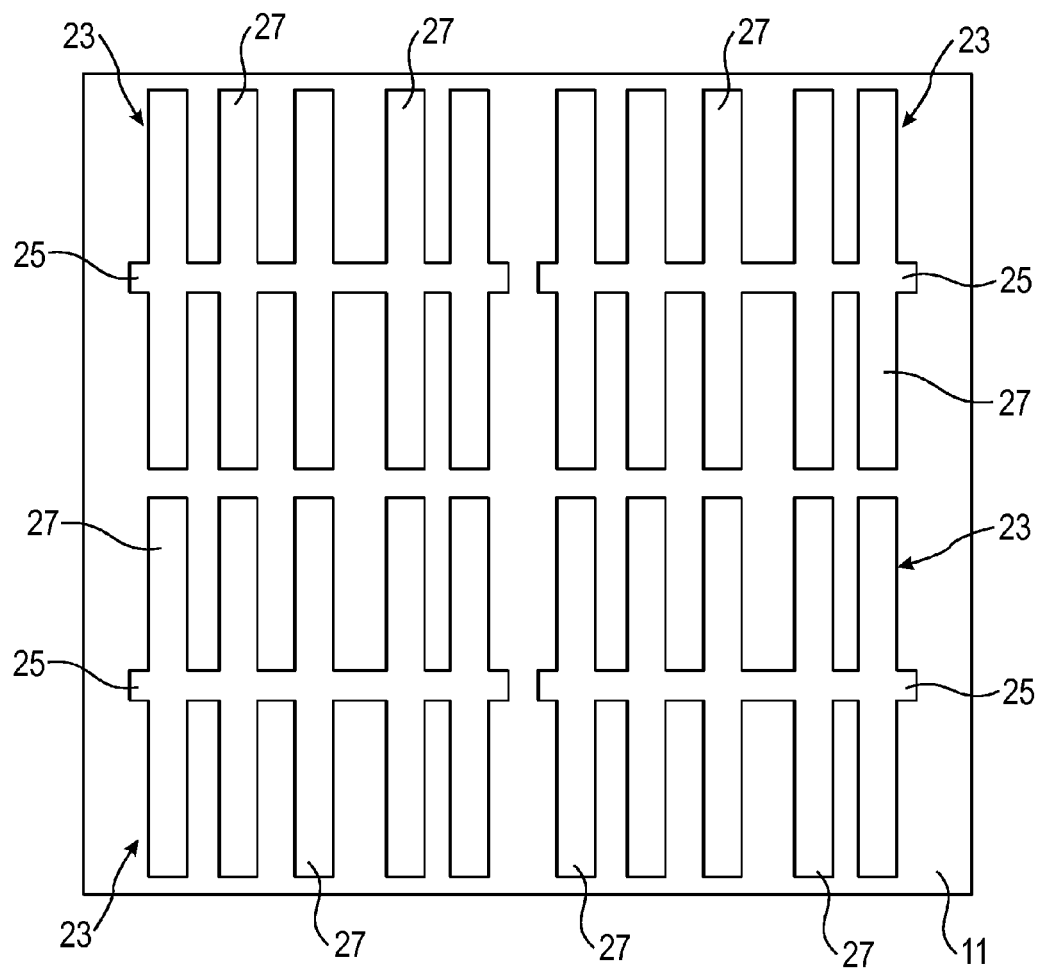
Figure 5:
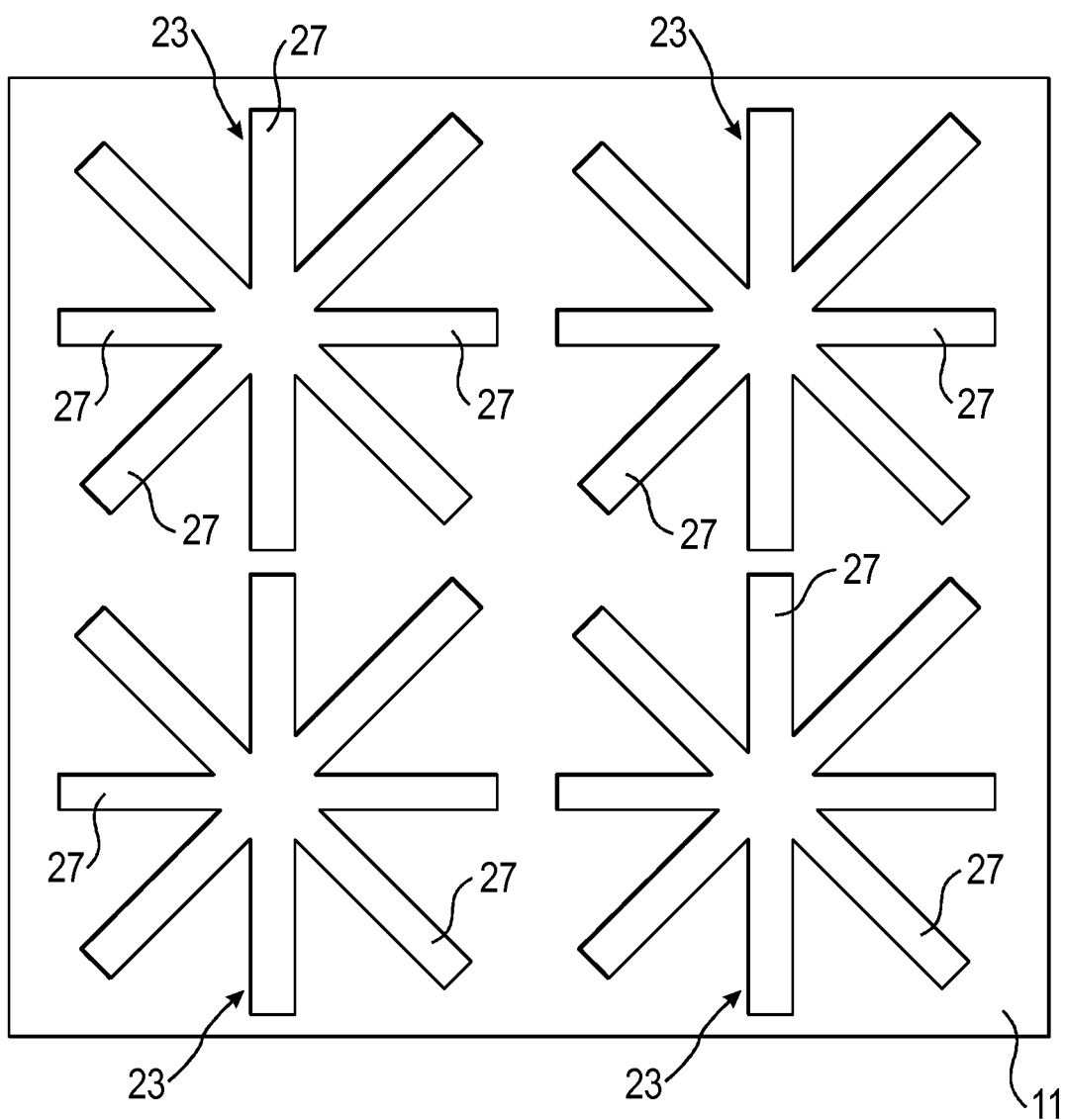
Figure 6:
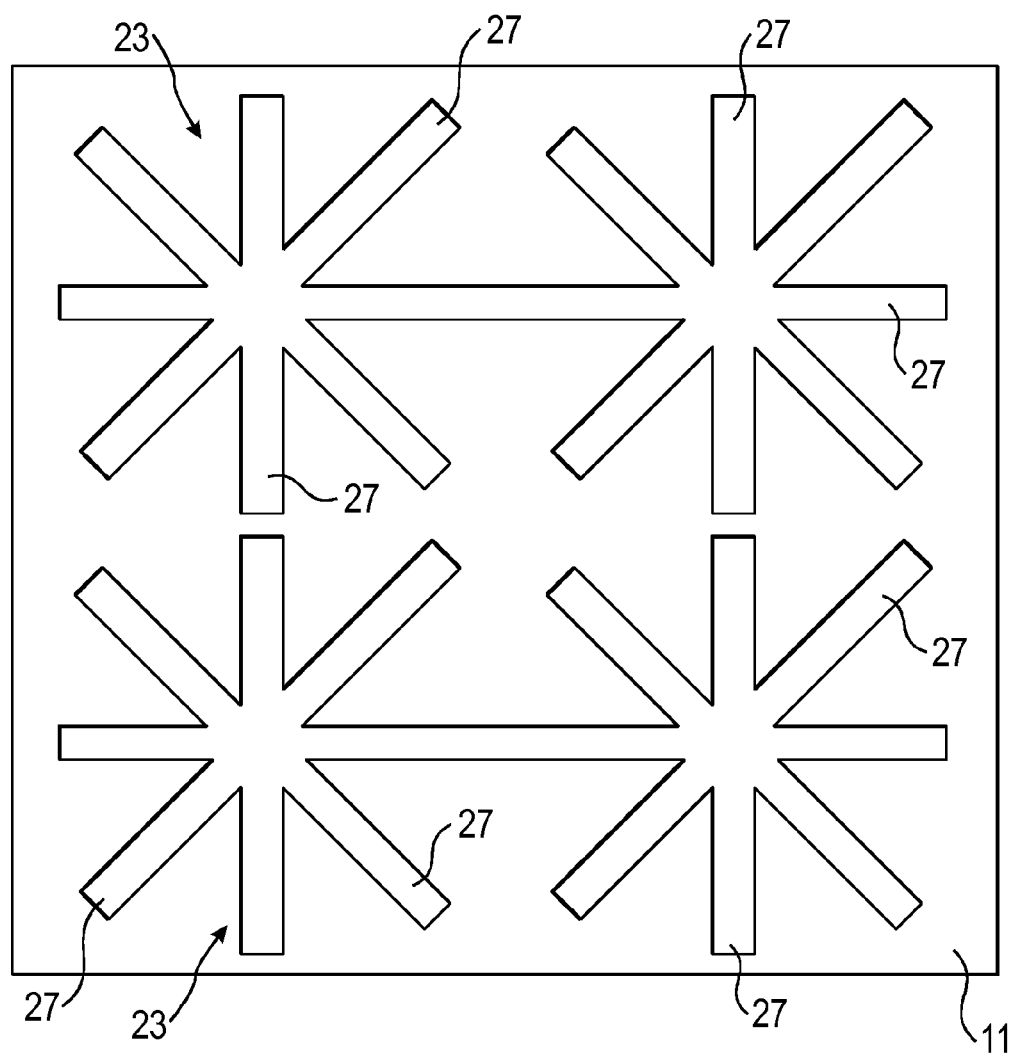
Figure 7:
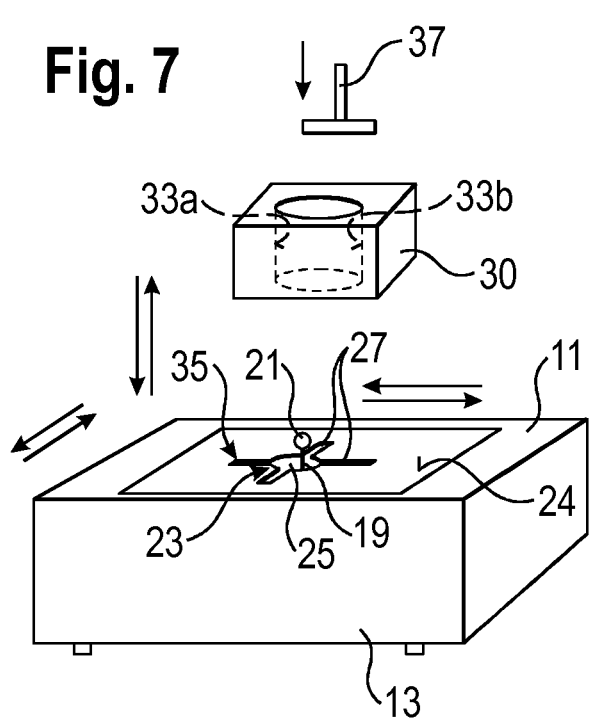
FIG. 7 is a perspective representation of an object measurement apparatus in accordance with the invention.

As can be seen from FIGS. 4-6, a plurality of mutually separate cut-outs 23 can also be provided next to one another in the base plate 11. This can further improve the movement possibilities for the probe 17. On the selection of the number, size, shape and arrangement of the cut-outs 23, it must, however, always be considered that a sufficient strength of the base plate 11 is ensured.

The position of a sampled measured point is determined by the superimposition of the position of the probe 17 and of the position of the sampling body 19 or of the sensing ball 21 relative to the probe 17. A computer system 31, e.g. a PC, controls the movements of the actuator 15, detects the sampling points, evaluates the positions and presents the measured result.

To measure the workpiece 30, the sampling body 19 is introduced into the workpiece 30 lying on the base plate 11 and is moved within the cut-out 23. The sampling body 19 can specifically move sequentially to two oppositely disposed inner walls 33a, 33b of the workpiece 30 to determine the spacing of the oppositely disposed inner walls 33a, 33b from one another from the movement path. Wall spacings in two mutually perpendicular directions x and y can be determined on the basis of the crosshair-type shape of the cut-out 23. Since the sampling body 19 can also be moved in height, i.e. in the z direction, by means of the actuator 15, such distance measurements can also be carried out at different heights of the workpiece 30. The displaceability of the sampling body 19 in the z direction moreover serves to move it into the workpiece 30 after the workpiece is set or placed onto the base plate 11. The sampling body 19 can be arranged beforehand in an end position 35 of the path sections 27 as a rest position and can be moved, after the placing of the workpiece 30 onto the base plate 11, into the measuring or operating position beneath the workpiece 11.

A holding-down device 37 is provided for fixing the workpiece 30 on the base plate 11. The workpiece 30 placed onto the base plate 11 can be pressed toward the support surface 24 and thus fixed during the measurement by means of the holding-down device. With sufficiently heavy workpieces, the use of the holding-down device 37 is not necessary.

A centering ring 39 can be used to facilitate a precisely positioned setting of particularly small workpieces 30' onto the base plate 11. The centering ring has spigot-like projections 43 on its lower side 41 which can be brought into engagement with corresponding recesses 45 in the base plate 11. The centering ring 39 is thereby fixed with a precise position with respect to the base plate 11. The small workpiece 30' can now be inserted into the central opening 47 of the centering ring 39 and can thereby be exactly positioned. For different workpieces 30', different centering rings 39 can be provided which each have openings 47 with differently sized inner diameters.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An apparatus for measuring objects, the apparatus comprising:
   a base plate for supporting an object to be measured, the base plate having a planar support surface; and
   a probe which is movable relative to the object by means of an actuator to sample the object in a contacting manner, wherein the probe carries a sampling body whose front end is formed as a measuring tip for a contact with the object, wherein the probe is arranged beneath the base plate, with at least one cut-out being provided in the base plate for leading through at least one section of the sampling body.

2. An apparatus in accordance with claim 1, wherein said apparatus is a coordinate measuring unit.

3. An apparatus in accordance with claim 1, wherein said probe supports said sampling body in a mount.

4. An apparatus in accordance with claim 1, wherein said sampling body is an elongate sampling body.

5. An apparatus in accordance with claim 1, wherein the cut-out includes at least one linear path section.

6. An apparatus in accordance with claim 1, wherein the cut-out includes a central free space and at least two linear path sections extending outwardly from the central free space.

7. An apparatus in accordance with claim 1, wherein the cut-out is cross-shaped, star-shaped or rake-shaped.

8. An apparatus in accordance with claim 1, wherein the probe is movable by means of the actuator between a position of rest in which the sampling body does not project beyond a support surface of the base plate and an operating position in which the sampling body is guided through the cut-out from below and the measuring tip is located above the support surface.

9. An apparatus in accordance with claim 1, wherein the probe is movable into a plurality of heights by means of the actuator for measuring.

10. An apparatus in accordance with claim 1, wherein at least one centering element is attached or attachable to the base plate for positioning an object to be measured.

11. An apparatus in accordance with claim 1, wherein recesses are provided at the base plate for an engagement with projections of a centering element, or vice versa.

12. An apparatus in accordance with claim 1, wherein the base plate is attached to a housing in which the probe and the actuator are accommodated.

13. An apparatus in accordance with claim 1, wherein the actuator is formed as a three-dimensional positioning system which is in mechanical connection with the base plate.

14. An apparatus for measuring objects comprising:
   a base plate for supporting an object to be measured, wherein the base plate has a support surface for the direct placing on of the object to be measured;
   a probe which is movable relative to the object by means of an actuator to sample the object in a contacting manner, wherein the probe is arranged beneath the base plate, with at least one cut-out being provided in the base plate for leading through at least one section of the sampling body; and
   a holding-down device which is designed to press an object toward the support surface from above for fixing the object to be measured on the base plate.

* * * * *